US00RE40955E

(19) United States
(12) Reissued Patent
Le et al.

(10) Patent Number: US RE40,955 E
(45) Date of Reissued Patent: Nov. 10, 2009

(54) METHOD AND APPARATUS FOR STORING POSITION OFFSET INFORMATION ON A HARD DRIVE ASSEMBLY CYLINDER

(75) Inventors: Me Van Le, Milipilas, CA (US); Jong-Ming Lin, Cupertino, CA (US)

(73) Assignee: Samsung Electronics Co., Ltd., Suwon (KR)

(21) Appl. No.: 09/765,891

(22) Filed: Jan. 18, 2001

(Under 37 CFR 1.47)

Related U.S. Patent Documents

Reissue of:

(64) Patent No.: 5,867,343
Issued: Feb. 2, 1999
Appl. No.: 08/713,872
Filed: Sep. 13, 1996

U.S. Applications:

(63) Continuation-in-part of application No. 08/641,685, filed on May 1, 1996, now Pat. No. 6,008,962.

(51) Int. Cl.
*G11B 5/596* (2006.01)

(52) U.S. Cl. ..... 360/77.08; 360/77.04

(58) Field of Classification Search ..... 360/77.08, 360/77.04, 77.06, 77.11, 78.14
See application file for complete search history.

(56) References Cited

U.S. PATENT DOCUMENTS

| | | | | | |
|---|---|---|---|---|---|
| 4,890,172 | A | * | 12/1989 | Watt et al. | 360/77.04 |
| 5,453,887 | A | * | 9/1995 | Negishi et al. | 360/77.08 |
| 5,500,776 | A | * | 3/1996 | Smith | 360/77.04 |
| 5,523,902 | A | * | 6/1996 | Pederson | 360/77.08 |
| 5,570,247 | A | * | 10/1996 | Brown et al. | 360/77.05 |
| 5,606,469 | A | * | 2/1997 | Kosugi et al. | 360/77.04 |
| 5,867,353 | A | * | 2/1999 | Valent | 360/77.08 |

* cited by examiner

*Primary Examiner*—Thang V Tran
(74) *Attorney, Agent, or Firm*—Irell & Manella LLP

(57) ABSTRACT

A method and apparatus for storing position offset information not used for aligning the read element of an MR head with the centerline of written data, during a read operation. The skew or offset between the read and the write elements on a read head is first calibrated. The offset information then stored on one or more dedicated tracks of the disk. To accomplish this, the write element is aligned with the centerline of the dedicated track. The position offset information is then written in the data field of the dedicated track. During the power-on process, the read element is aligned with the centerline of the dedicated track and the position offset information may be retrieved by simply reading the information previously stored on the dedicated track.

16 Claims, 12 Drawing Sheets

METHOD AND APPARATUS FOR STORING POSITION OFFSET INFORMATION ON A HARD DRIVE ASSEMBLY CYLINDER

Matter enclosed in heavy brackets [ ] appears in the original patent but forms no part of this reissue specification; matter printed in italics indicates the additions made by reissue.

The present application is *an REI of 08/713,872 filed Sep. 13, 1996, now U.S. Pat. No. 5,867,343, which is* a continuation-in-part application of U.S. patent Ser. No. 08/641,685*, now U.S. Pat. No. 6,008,962,* entitled "Method and Apparatus for Providing Read and Write Skew Offset Information for a Magneto-Resistive Head" filed May 1, 1996.

BACKGROUND OF THE INVENTION

1. Field of the Invention

The present invention relates in general to disk storage systems and more particularly, to a method and apparatus for providing and storing skew offset information for aligning the read element of a magneto-resistive (MR) head with the centerline of written data during a read operation.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately located relative to the centerline of the track. The signals produced by the servo bits are typically demodulated into position offset signals which are used to determine the position of the head relative to the track, and to move the actuator arm if the head is not located on the track centerline.

There has been developed a dual element transducer which includes a single write element and a separate read element which is constructed from a magneto-resistive material. Such dual element transducers are commonly referred to as magneto-resistive (MR) heads. Because of manufacturing tolerances, the separate magneto-resistive read element may be off-center or skewed from the write element of the head. Therefore, if data is written off the center of the track, to read the data, the servo system must move the head slightly off-center so that the read element is centered with the written data.

Additionally, while the head and write elements may be aligned with the head is positioned over a particular track, when the head is moved to another track, the read element may no longer be aligned with the write element. For example, as shown in FIGS. 1A and 1B, when the head is positioned over a track along the outer diameter of the disk, the centers of the read and write elements (R and W respectively) are aligned. However, as shown in FIGS. 2A and 2B, when the head is positioned over a track along the inner diameter of the disk, the centers of the read R and write W elements are no longer aligned. The servo system must move the head slightly off-center, so that the read element R is centered with the written data. The routine of moving an MR head during a read operation is commonly referred to as micro-jogging.

It also has been determined that the skew offset information for an MR head located over the inner tracks of a disk is different from that of an MR head located over the outer tracks of a disk. In addition, such MR head skew offset information is typically non-linear, and it also generally varies greatly between heads.

Accordingly, there is a need in the technology for a method and apparatus for providing skew offset information used in the alignment of a magneto resistive head, so that a read element of an MR head may be aligned with the centerline of written data during a read operation.

In non-MR servo systems, the stored parameters are read during a power up sequence so as to optimize the performance for the particular drive. In systems utilizing an MR head, the data written on the dedicated tracks may not be centered exactly on the tracks because the read and write heads are offset. As a result, when the system attempts to read the written data, additional time is required to locate the centerline of written data. Alternatively, several attempts to read the written data may be required before successfully acquiring the written data. To compound this problem, the associated parameters are typically written on the outermost tracks of the disk where the largest offset between the read and write elements generally occurs.

Accordingly, there is also a need in the technology for an apparatus and method of storing system parameters so that hard drive assemblies utilizing MR heads may efficiently retrieve the stored information.

BRIEF SUMMARY OF THE INVENTION

A method and apparatus for storing position offset information not used for aligning the read element of an MR head with the centerline of written data, during a read operation. The skew or offset between the read and the write elements on a read head is first calculated. The offset information then stored on one or more dedicated tracks of the disk. To accomplish this, the write element is aligned with the centerline of the dedicated track. The position offset information is then written in the data field of the dedicated track. During the power-on process, the read element is aligned with the centerline of the dedicated track and the position offset information may be retrieved by simply reading the information previously stored on the dedicated track.

DETAILED DESCRIPTION OF THE INVENTION

Figure 1A:
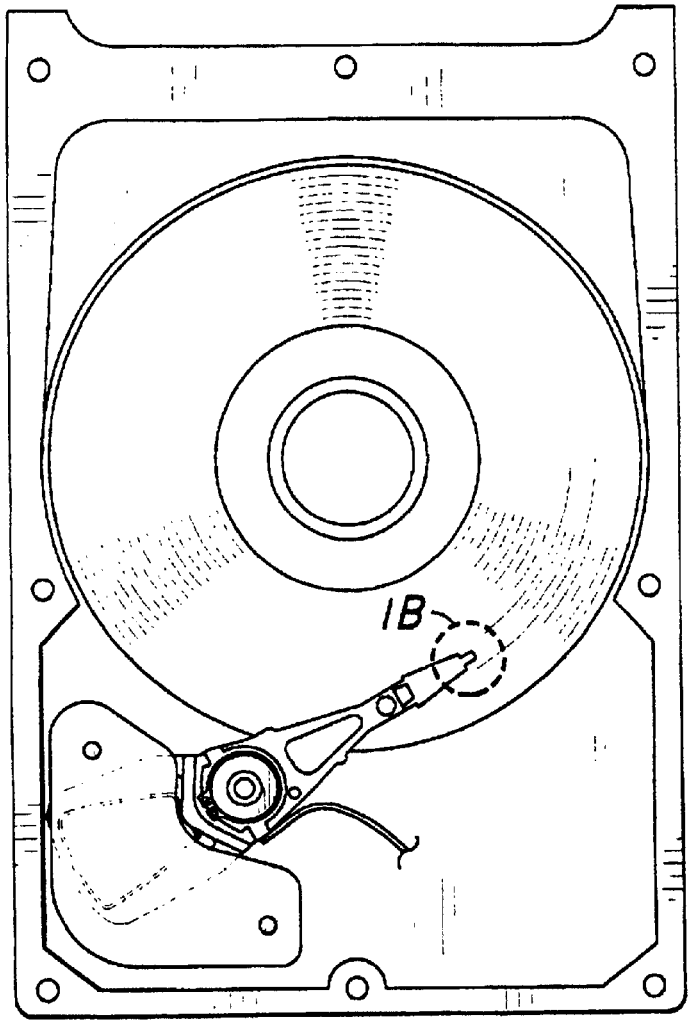
FIG. 1A (PRIOR ART)
FIG. 1A illustrates a read/write head positioned over a track along the outer diameter of a disk of the prior art.
Figure 1B:
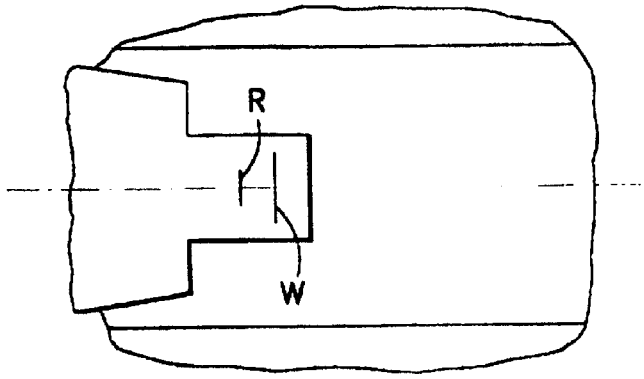
FIG. 1B (PRIOR ART)
FIG. 1B is an enlarged view of the read/write head of FIG. 1A, illustrating the relative positions of a read element that is aligned with a write element on a typical magneto resistive head, in the prior art.
Figure 2A:
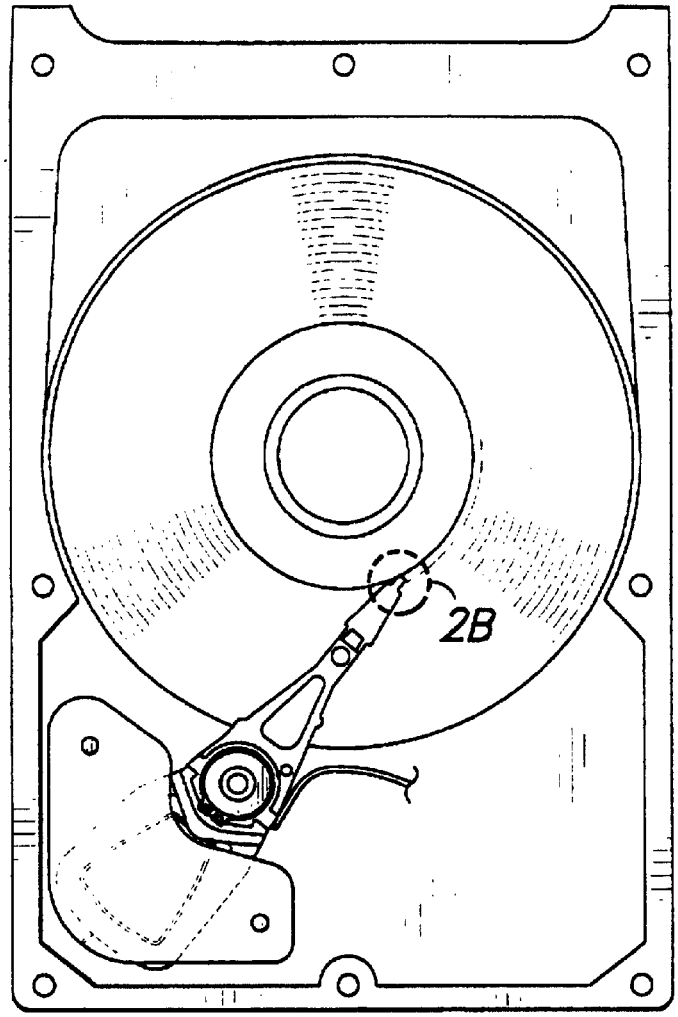
FIG. 2A (PRIOR ART)
FIG. 2A illustrates a read/write head positioned over a track along the inner diameter of a disk of the prior art.
Figure 2B:
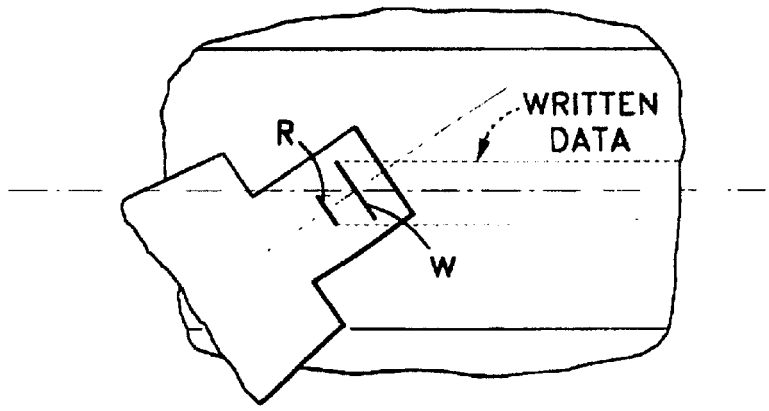
FIG. 2B (PRIOR ART)
FIG. 2B is an enlarged view of the read/write head of FIG. 2A, illustrating the relative positions of a read element that is misaligned with the write element on a typical magneto resistive head, in the prior art.
Figure 3:
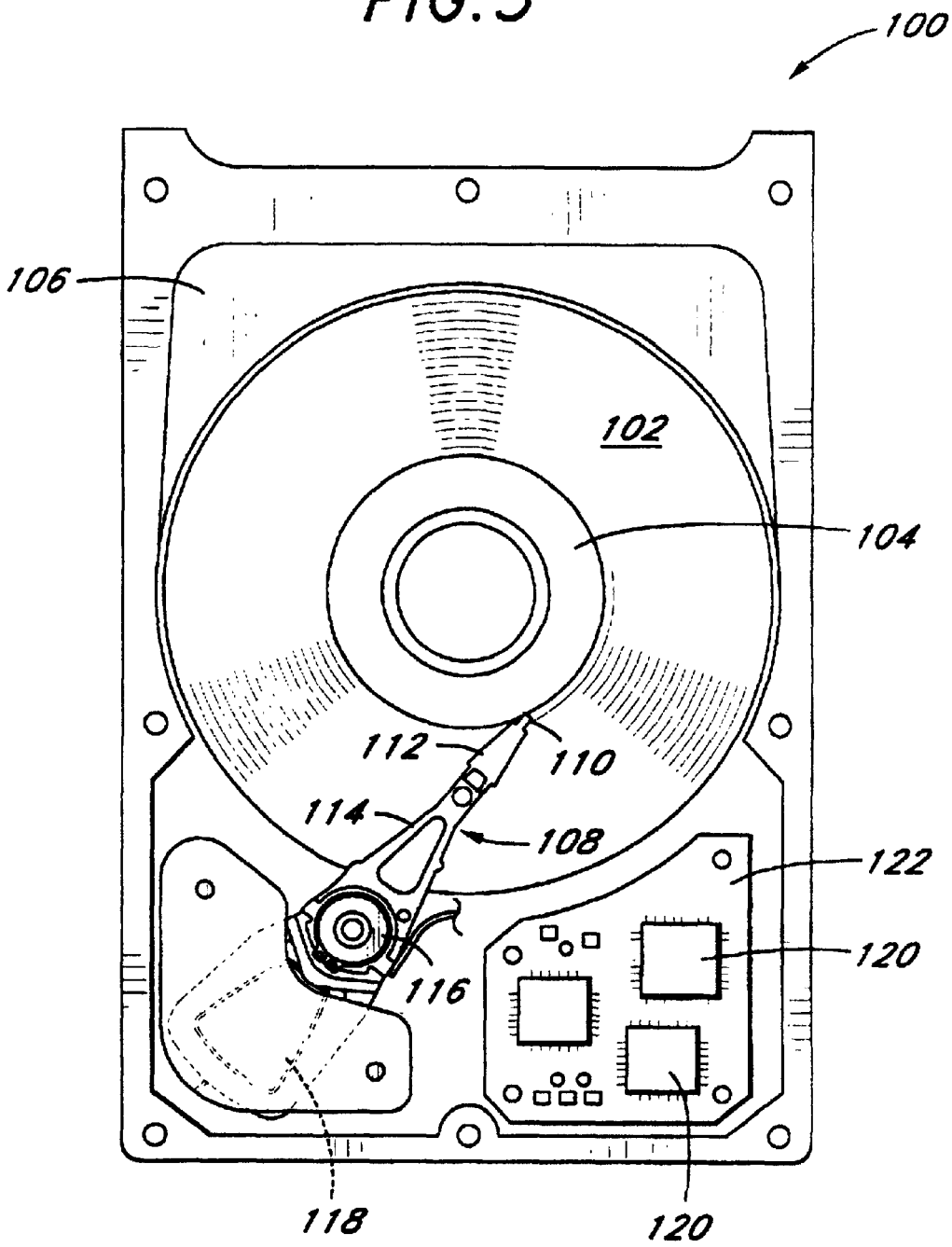
FIG. 3 illustrates a hard disk drive which utilizes the method of the present invention.

Referring to the drawings more particularly by reference numbers, FIG. 3 shows a hard disk drive 100. The disk drive 100 includes a disc 102 that is rotated by a spin motor 104. The spin motor 104 is mounted to a base plate 106. Also mounted to the base plate 106 is an actuator arm assembly 108. The actuator arm assembly 108 includes a number of heads 110 mounted to corresponding flexure arms 112. The flexure arms 112 are attached to an actuator arm 114 that can rotate about a bearing assembly 116. The assembly 108 also contains a voice coil motor 118 which moves the heads 110 relative to the disk 102. There is typically a single head for each disk surface. The spin motor 104, voice coil motor 118 and the heads 110 are coupled to a number of electronic circuits 120 mounted to a printed circuit board 122. In the following discussion, only one head 110 is referenced. The electronic circuits 120 typically include a read channel chip, a microprocessor-based controller and a random access memory (RAM) device.

Figure 4:
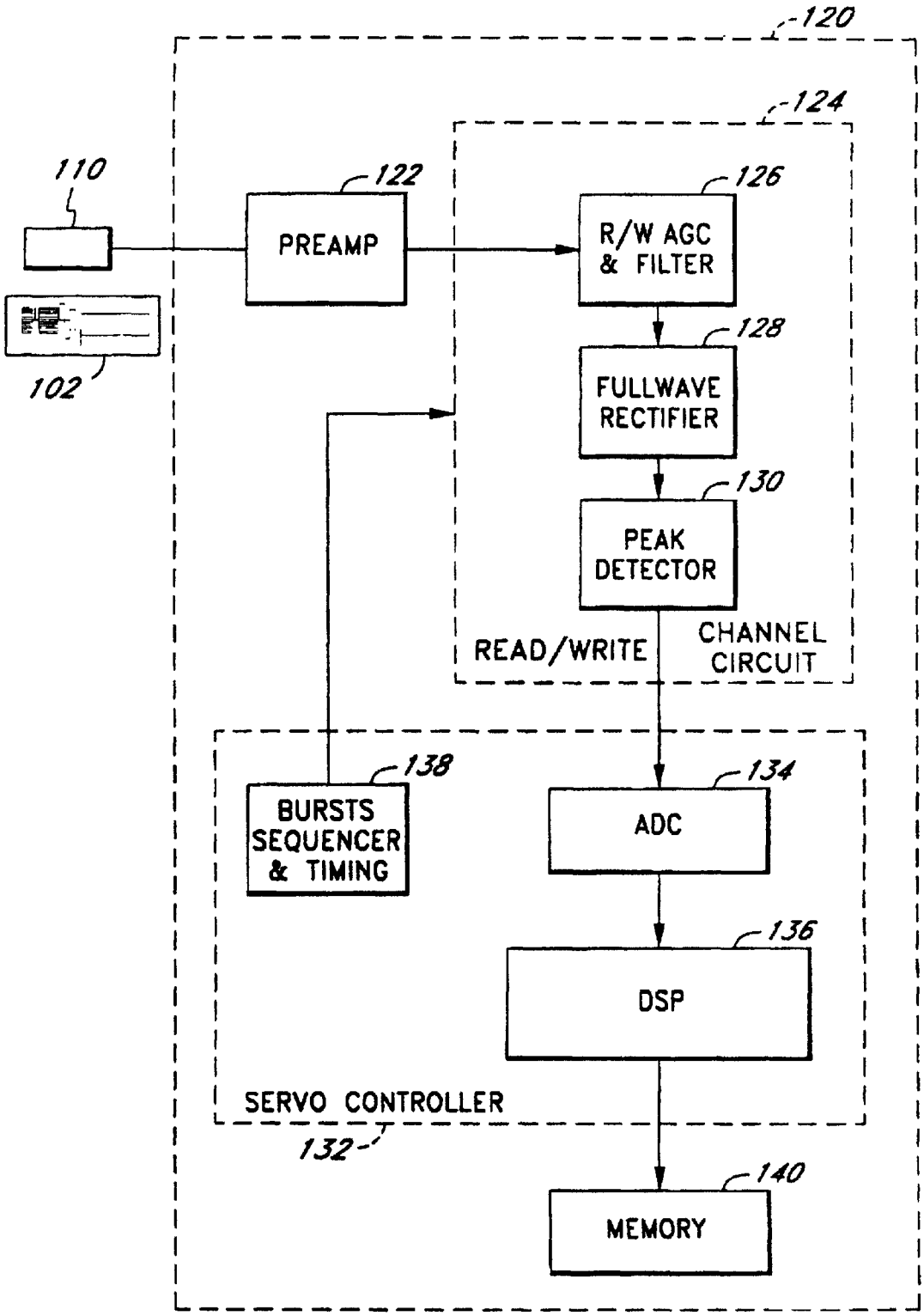
FIG. 4 is a block diagram of an integrated circuit read channel in accordance with the present invention.

FIG. 4 is a block diagram of one of the electronic circuits 120 of FIG. 3. The electronic circuit 120 includes a preamplifier 122 which is coupled to a read/write (R/W) channel circuit 124. The read/write channel circuit 124 includes a R/W Automatic Gain Control (AGC), a filter circuit 126, a fullwave rectifier 128 and a peak detector 130. The electronic circuit 120 further comprises a microprocessor-based servo controller 132 which includes an analog-to-digital converter (ADC) 134, a digital signal processor 136 and a burst sequencer and timing circuit 138. In addition, the electronic circuit 120 includes a random access memory (RAM) device 140.

The electronic circuit 120 is coupled to one of the magnetic heads 110 which senses the magnetic field of a magnetic disk 102. When reading the servo information located in the servo field region 110 on the disk 102, the head 110 generates a read signal that corresponds to the magnetic field of the disk 102. The read signal is first amplified by the preamplifier 122, and then provided to the R/W channel circuit 124. The AGC data included in the read signal is provided to the R/W AGC and filter circuit 126. The AGC data provided by the read signal is monitored by the R/W AGC circuit portion of circuit 126 and the read signal is then filtered by the filter circuit located in the circuit 126. The fullwave rectifier 128 rectifies the read signal and provides the rectified read signal to the peak detector 130. In response, the peak detector 130 detects the amplitude of the read signal. The read signal is then provided to the ADC 134 which provides digitized samples of the analog read signal. The digitized signal is then provided to a digital signal processor 136 which generates the position offset signals based on the servo information read by the head 110, as discussed in detail in the following sections. The values representing the position offset signals are stored in memory 140. The bursts sequencer and timing circuit 138 provide the timing required for the aforementioned processes.

Figure 5:
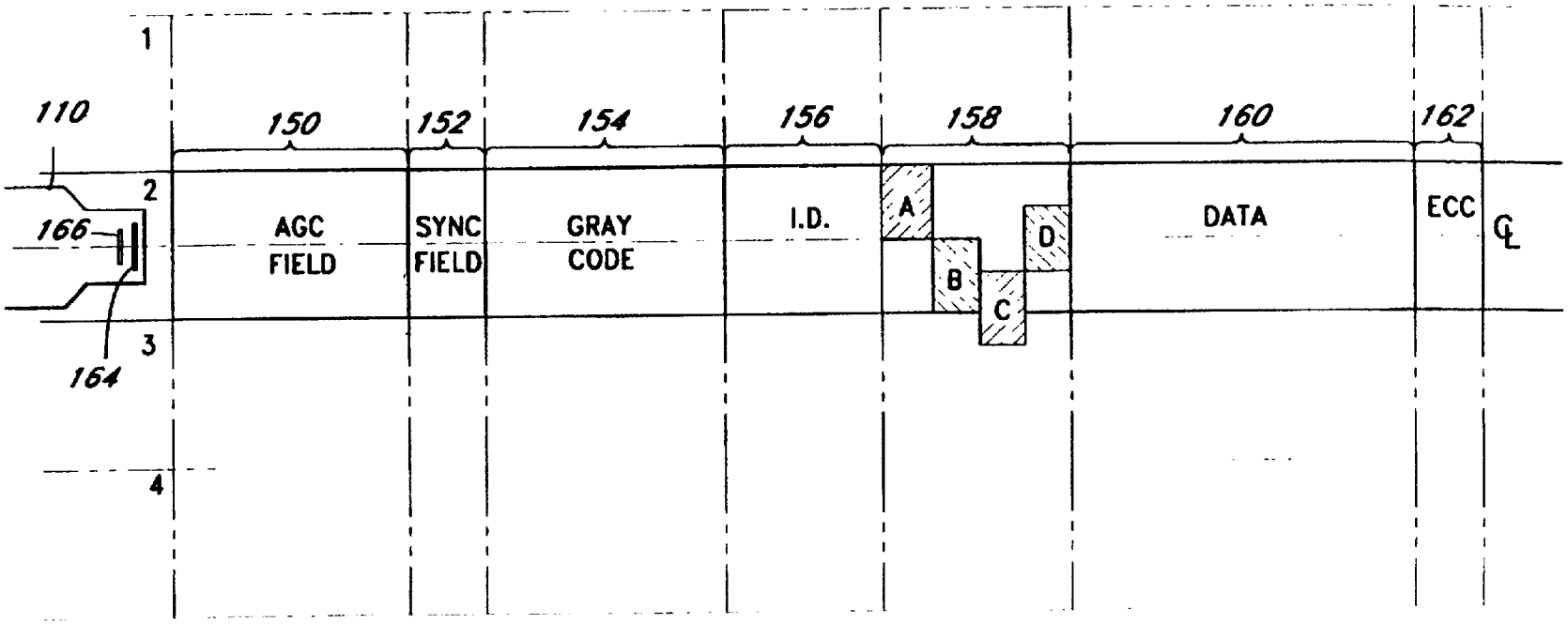
FIG. 5 illustrates a data sector of a disk.

As shown in FIG. 5, data is typically stored within sectors of radially concentric tracks located across the disk 102. A typical sector will have an automatic gain control (AGC) field 150, a synchronization (sync) field 152, a gray code field 154 that identifies the track, an identification (ID) field 156 that defines the sector, a servo field 158 which includes a number of servo bits A, B, C, D, a data field 160 which contains the data, and an error correction code field 162. The electronic circuits 120 utilize the servo bits A, B, C and D to maintain the heads 110 on the centerline CL of the track. If the heads 110 are off-center, the electronic circuits 120 will generate a position offset signal which has a voltage amplitude that varies with the distance that the heads 110 are off-set from the track centerline.

The heads 110 can magnetize and sense the magnetic field of the disk 102. In one embodiment, each head 110 has a single write element 164 and a separate read element 166 as shown in FIG. 5. The read element 166 is preferably constructed from a magneto-resistive material which changes resistance in proportion to the intensity of an external magnetic field. The read element 166 is sometimes off-set from the write element 164 because the tolerances associated with the manufacturing process of the head. Additionally, the center of the read element 166 may be offset from the center of the write element 164 because of the skew angle of the head 110 with respect to the track on the disk 102. If the read element 166 is aligned with the center CL of the track, and the write element 164 is off-set from the read element 166, the data will be written off-center from the center CL of the track. To properly read the data, the read element 164 must be moved over to the off-center location of the written data.

Figure 6B:
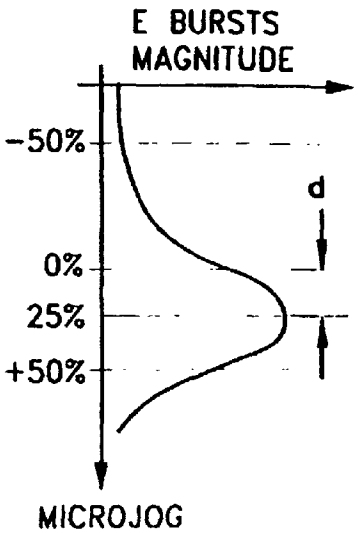
FIG. 6B is a graph illustrating the magnitude of the calibration burst with resect to the position of the read element of a magneto resistive head.
Figure 6A:
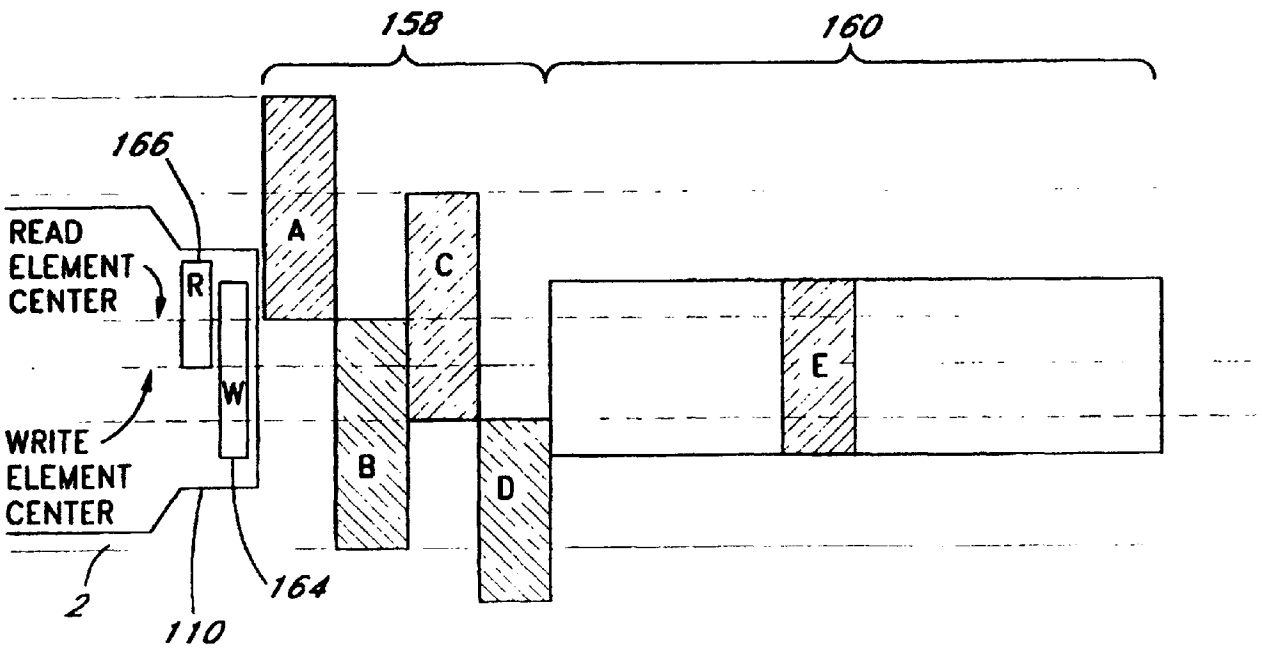
FIG. 6A is an enlarged view of a portion of the data sector of FIG. 5, illustrating the calibration burst utilized in the method of the present invention.

FIG. 6A is an enlarged view of a portion of the data sector of FIG. 5, illustrating the calibration burst E utilized in the method of the present invention. The calibration burst E is located in a calibration field and is used to generate a position offset signal. The calibration field has a calibration field centerline that is offset from the track centerline. Information representing the position offset is stored in a calibration storage field located on one of the tracks. The calibration storage field has a calibration storage field centerline that is centered along the track centerline. In one embodiment, the calibration burst E is written in the data field 160 of every sector on a predetermined number of tracks of the disk 102. For example, the calibration burst E may be written only on every fourth track. The number of tracks on which the calibration burst E are written may be determined by calibration accuracy requirements.

The servo field 158 in each sector contains a number of servo bits designated A, B, C and D. The boundary formed by the A and B servo bits defines a track CL of the disk 102. The center of the C servo bit is aligned with the center CL of the track. The D servo bit is offset 180° from the position of the C servo bit. The servo bits A and B are used to center the read element with the centerline CL of the dedicated track where the value of A-B corresponds to the off-track position of the head 110 if A-B is a non-zero value. This is accomplished by detecting the amplitude of the servo bursts provided by servo bits A, B, C and D using the read element 166 of the head 110. If the center of the read element 166 is not aligned with the center of the write element 164 (and thus, the center of the written data), then the servo controller 132 will generate a position offset signal using the technique of the present invention, to move the head 110 so that alignment of the center of the read element 166 with the center of the written data may be accomplished.

The distance that the head 110 has to be moved in such a situation is determined by the offset between the read element 166 and the write element 164 for a particular track. The technique of the present invention determines the magnitude of this offset through the use of a calibration burst E. The calibration burst E has a centerline located at a predetermined off-set position from the track centerline CL. The centerline of the calibration burst E is also the center of the write element 164 since the calibration bursts E are written by the write element 164 during the calibration process of the disk drive.

FIG. 6B is a graph illustrating the magnitude of the calibration burst E with respect to the position of the read element 164 of a magneto resistive head. Upon writing the calibration burst E in the required servo sectors, the servo controller 132 (FIG. 4) performs a seek routine by moving the head 110 from track center to track center. The profile of the calibration burst E with respect to the center CL of each track is then obtained by sampling the amplitude of the calibration burst E over the width of the track. This is done by micro-jogging the head 110 in increments, from a position that is −50% from the center of the track to a position that is +50% from the center of the track, and reading the amplitude of the calibration burst E. This routine is repeated for all servo sectors in which a calibration burst E has been written. The position value d corresponding to the peak value of the calibration burst E obtained during the micro-jogging process represents the offset value between the read and write elements 164 and 166, at a particular track location. Upon obtaining the offset value, the servo controller 132 will generate a demodulated position offset signal having an amplitude representative of the position offset value.

Figure 7A:
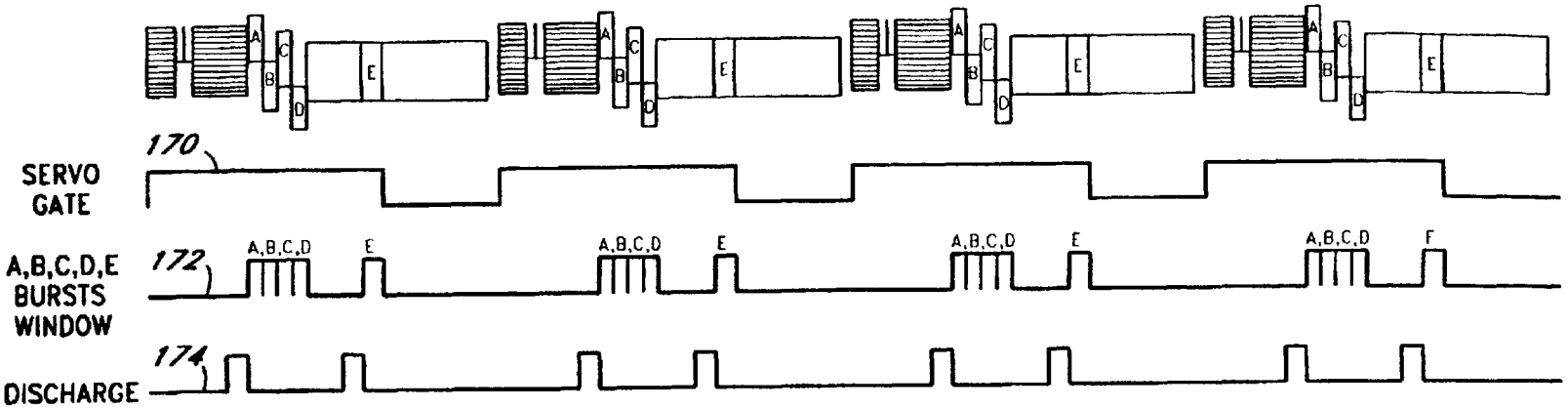
FIG. 7A illustrates a timing diagram of the servo burst sequence used in calibrating the offset values between the read and write elements in a magneto resistive head, in accordance with the teachings of the present invention.

FIG. 7A illustrates a timing diagram of the servo burst sequence used in calibrating the offset values between the read and write elements in a magneto resistive head, in accordance with the teachings of the present invention. The bursts sequencer and timing circuit 138 in the servo controller 132 controls the timing of a servo gate 170, the timing of cycle 172 of servo bursts A, B, C, D and E, and the discharge cycles 174 for initiating the servo bursts. During offset calibration, servo burst reading or writing is accomplished during the positive pulses of the servo gate 170. Within a single cycle of the servo gate 170, reading of servo bursts A, B, C and D is initiated at the falling edge of the first discharge pulse 174. Reading of the calibration burst E is initiated at the falling edge of the second discharge pulse 174. The offset calibration cycles continue until offset calibration for all required tracks is accomplished.

Figure 7B:
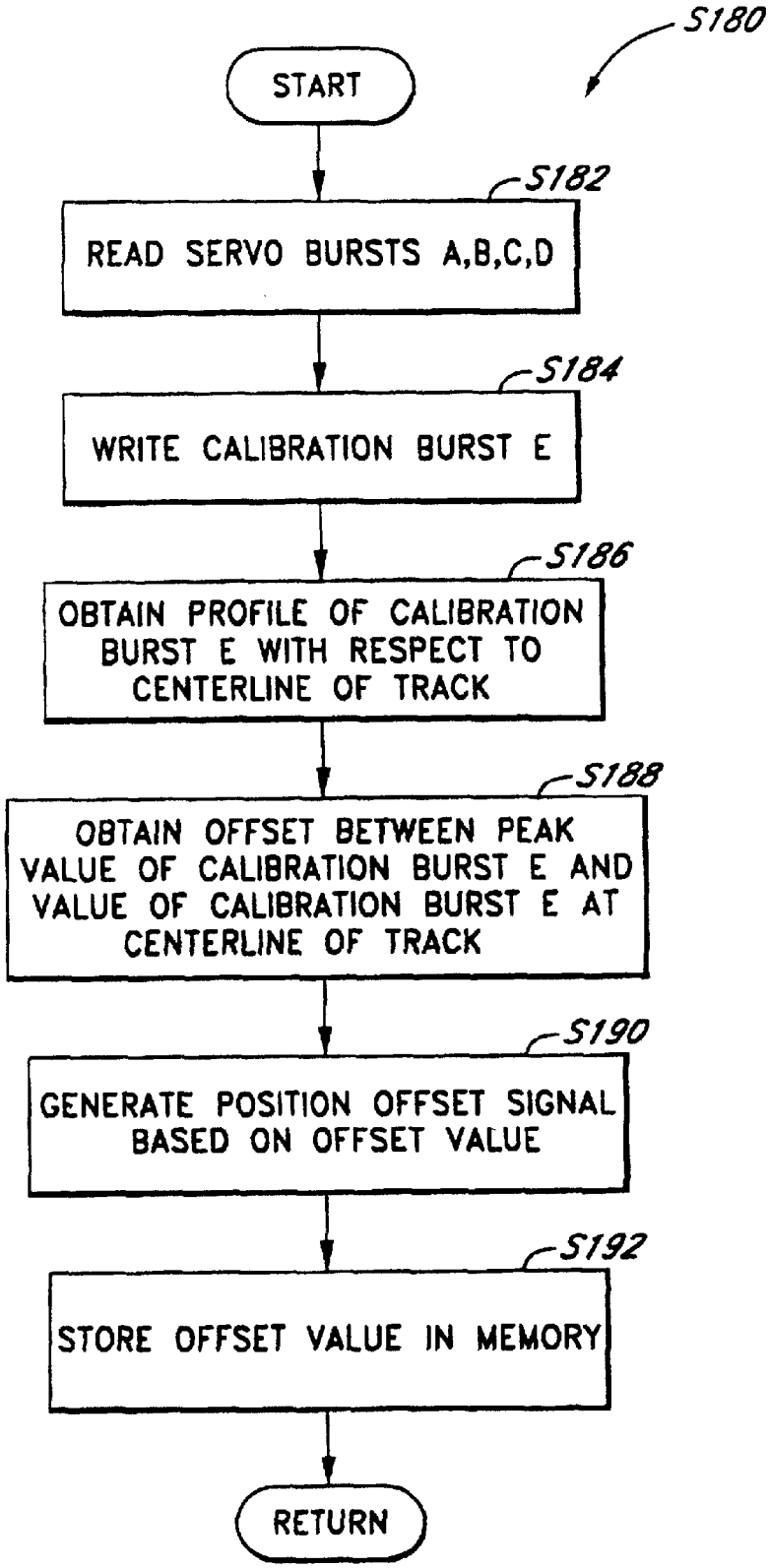
FIG. 7B is a flowchart illustrating the offset calibration technique of the present invention.

FIG. 7B is a flowchart illustrating the offset calibration process of the present invention. The offset calibration process S180 begins from a start state and proceeds to process step S182, where the read element 166 reads the servo bursts A, B, C, and D upon receiving a control signal (i.e., the falling edge of the discharge pulse 174). The servo information obtained is provided to the servo controller 132, which generates a signal for the voice coil to position the head 110 along the center of a track. The process S180 then proceeds to write the calibration burst E in the required servo sectors, as shown in process step S184.

Next, the process S180 obtains a profile of the calibration burst E with respect to the center CL of each track by sampling the amplitude of the calibration burst E over the width of the track, as shown in process step S186. This is done by first performing a seek to a position that is −50% from the center of the track, and then micro-jogging the head 110 in increments, from a position that is −50% from the center of the track to a position that is +50% from the center of the track, and reading the amplitude of the calibration burst E. This routine is repeated for all servo sectors in which a calibration burst E has been written.

The position value d corresponding to the peak value of the calibration burst E represents the offset value between the read and write elements 164 and 166, at a particular track location. The position offset signal should be ideally zero when the read element 166 is centered with the written data. If the read element 166 is off-set from the write element 164 the position offset signal has some non-zero value when the read element is centered over the written data.

Upon obtaining the offset value, the servo controller 132 will generate a position offset signal having an amplitude representative of the offset value, as shown in process step S188. The value of the position offset signal corresponding to a particular track and sector is stored in RAM 140 for use during normal operation of the disk drive 100 as shown in process step S190. In one embodiment, the position offset values corresponding to the track number (as identified by gray code) and the ID number (which provides the identification of the sector number) are stored in a table for later referral. Upon completion of the calibration process, the process S180 terminates.

Figure 8:
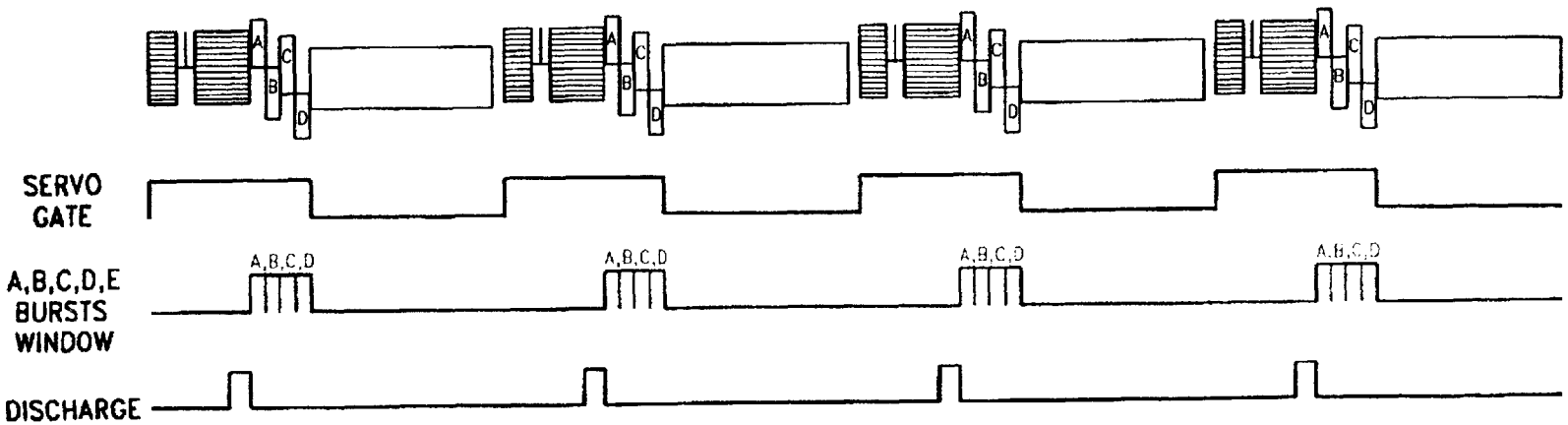
FIG. 8 illustrates a timing diagram of the servo burst sequence during normal operation of a hard disk drive, upon implementing offset calibration, in accordance with the teachings of the present invention.

FIG. 8 illustrates a timing diagram of the servo burst sequence during normal operation of a hard disk drive, after offset calibration has been performed, in accordance with the teachings of the present invention. Upon calibrating the read and write elements 166 and 164 of the head 110, normal operation of the disk drive 100 may proceed. During normal operation of a calibrated drive, the heads 110 are directly moved to the offset position in accordance with the best reading of the written data during the read operation.

The disk drive 100 typically goes through the routine of generating the position offset values after each "power-on" sequence of the drive. Alternatively, the position offset values can be generated when then disk drive 100 is initially assembled and then stored in a non-volatile memory medium such as the disk 102.

Figure 9A:
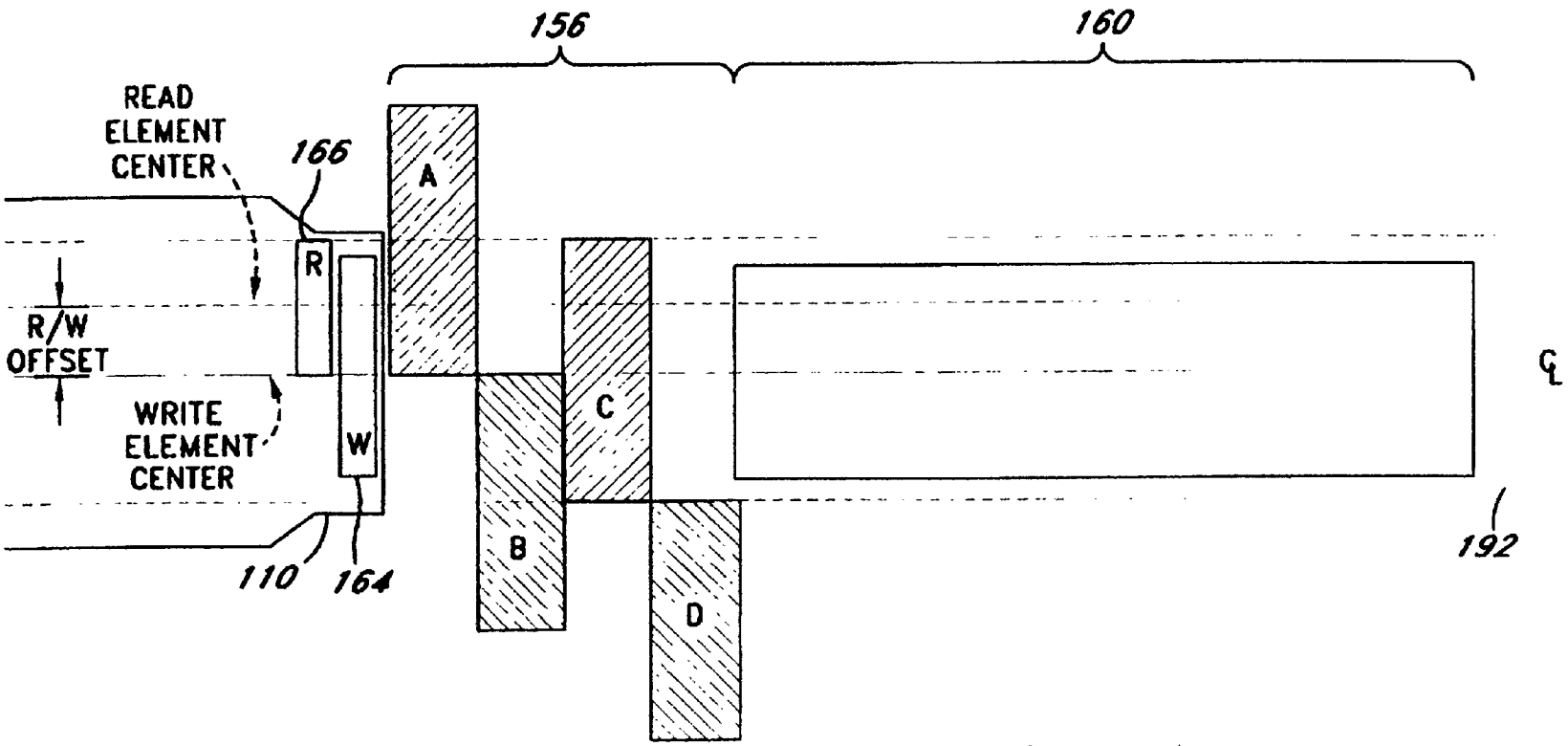
FIG. 9A is an enlarged view of the magneto resistive head of FIG. 5, illustrating the relative position of the write element that is aligned with a track centerline during the writing of system parameters on the track.

In a further aspect of the present invention, the position offset values may also be stored on one or more dedicated tracks 192 on the disk 102 (see FIG. 9A). Upon powering on, the read element 166 will be directed by the servo controller 132 (see FIG. 4) to the position offset values written on the dedicated track 192. Using the position offset values thus stored, the read element 166 of an MR head may be accurately aligned with the centerline of written data during a read operation.

Figure 9B:
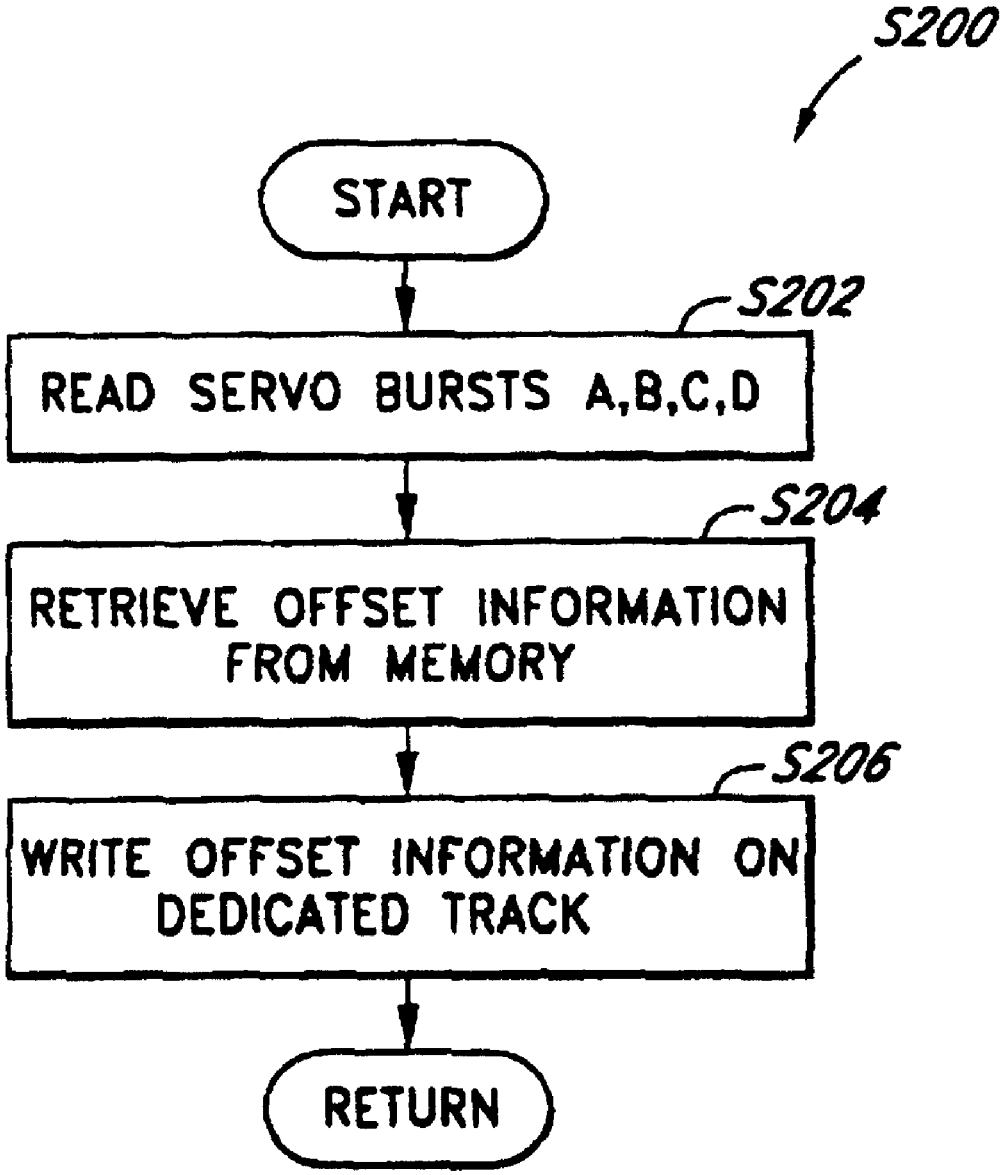
FIG. 9B is a flowchart illustrating the system parameter storage process of the present invention.

FIG. 9A is an enlarged view of MR head of FIG. 5, illustrating the relative position of the write element 164 that is aligned with a track centerline during the writing of system parameters on the track 192. FIG. 9B is a flowchart illustrating the system parameter storage process S200 in accordance with the teachings of the present invention. Referring to both FIGS. 9A and 9B, the process S200 begins from a start state and proceeds to process step S202, where the read element 166 reads the servo bursts A, B, C and D upon receiving a control signal from the servo controller 132. The servo information obtained is provided to the servo controller 132, which generates a signal to the voice coil motor 118 (see FIG. 3) to position the write element 164 along the center of a dedicated track 192. The process S200 then proceeds to step S204 to retrieve the offset information that was previously obtained using the process S180 (as shown in FIG. 7B) and which was stored in memory 140 (FIG. 4).

Next, the process S200 advances to process step S206, where the write element 164 is first aligned with the centerline of the dedicated track 192 using the position offset information stored in memory 140. The process S200 then writes the position offset information on the dedicated track 192. Other system parameters, such as the read/write channel parameters, may also then be stored on the dedicated track 192. Note that during the process S200, the read element 166 is off the track centerline while the write element 164 is aligned with the track centerline.

Figure 10A:
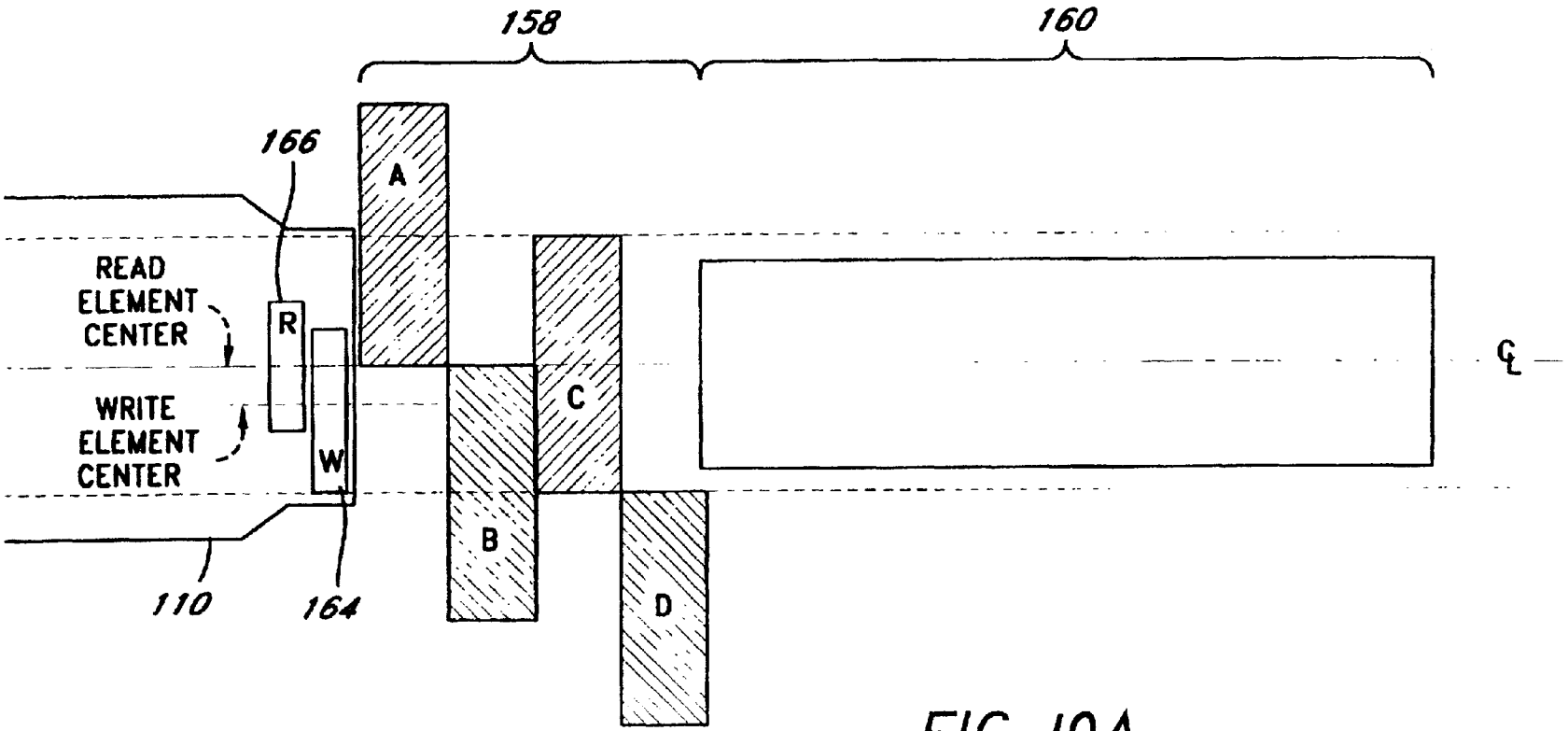
FIG. 10A is an enlarged view of the magneto resistive head of FIG. 5, illustrating the relative position of the read element that is aligned with a track centerline during the reading of system parameters located on the track.
Figure 10B:
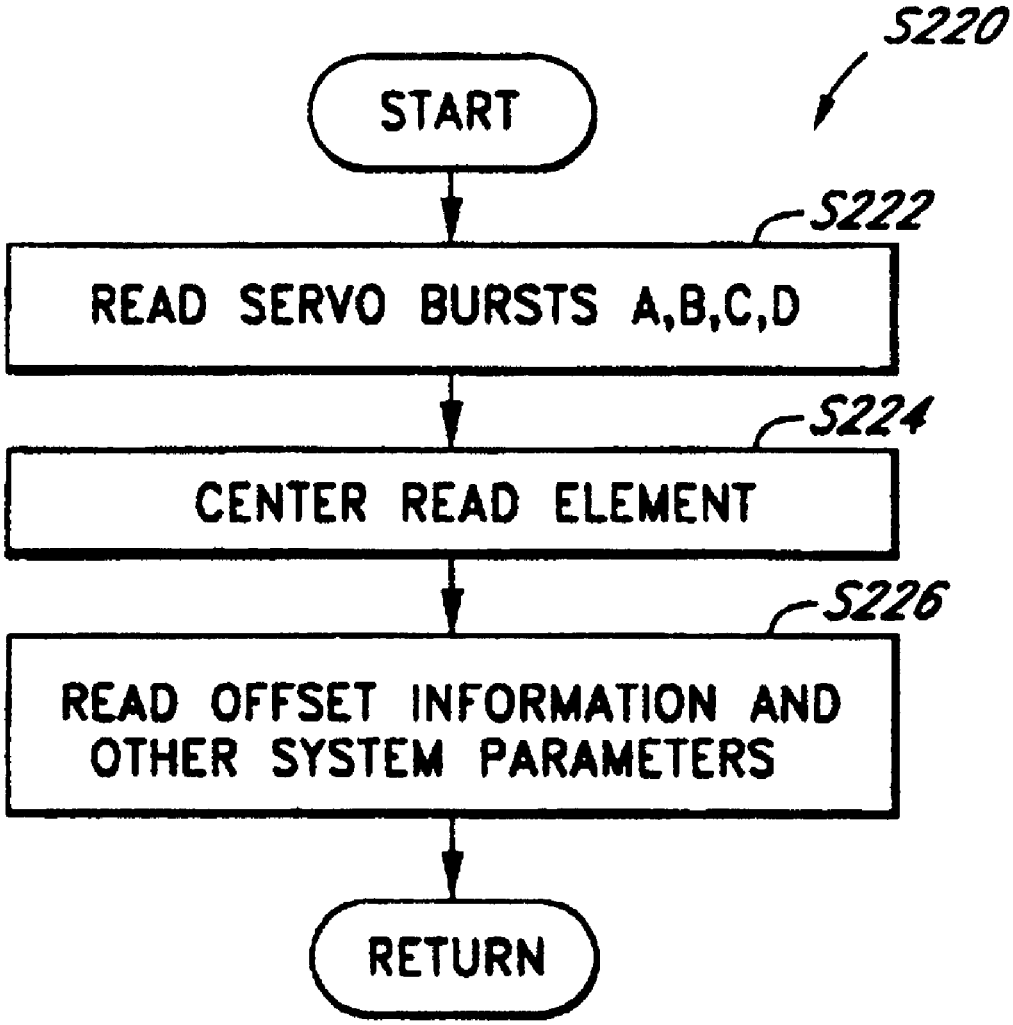
FIG. 10B is a flowchart illustrating the system parameter retrieval process of the present invention.

During the power-up process S220, as shown in FIG. 10B, the servo controller 132 first directs read element 164 to read the servo bursts A, B, C, D on the dedicated track 192 (step S222). Based on the servo information read, the servo controller 132 directs the voice coil motor 118 (FIG. 3) to align the read element 166 with the centerline of the dedicated track 192 (step S224). When aligned, the read element 164 reads all the previously stored position offset values and other system parameters from the dedicated track 192 (step S226). This information may be stored back in the memory 140 for later use. Alternatively, it may be used immediately following the read process for various servo operations. The information thus retrieved may be used during the read operation.

Through the use of the present invention, the skew or position offset information used in the alignment of a read element of an MR head may be provided and stored, so that the read element of an MR head may be accurately aligned with the centerline of written data during a read operation, without any additional calibration.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A disk for a hard disk drive having a head including a read element and a write element, the read element and the write element having a position offset, comprising:

a disk having a plurality of tracks, each track having a centerline, one of said tracks having a servo field and a calibration field with a calibration field centerline that is offset from the track centerline, said calibration field includes a single calibration burst providing a burst profile with a peak value, that is used to generate a position offset signal, said calibration burst being written by said head, a second one of said tracks having a servo field and a calibration storage field with a calibration storage field centerline that is centered along the track centerline, wherein information representing the position offset is stored in the calibration storage field.

2. The disk as recited in claim 1, wherein said position offset signal has a position offset signal amplitude that is stored in said calibration storage field.

3. The disk as recited in claim 1, wherein said track includes a data field, said calibration field being located in said data field.

4. The disk as recited in claim 1, wherein said servo field of said one of said tracks and said servo field of said second one of said tracks each contains a set of servo bits including an A bit and a B bit that have a common boundary located at the track centerline.

5. A hard disk drive, comprising:

a housing;

an actuator arm mounted to said housing;

a head that is mounted to said actuator arm, said head having a write element and a read element, the read element and the write element having a position offset;

a spin motor mounted to said housing; and a disk attached to said spin motor, said disk having a plurality of tracks that each have a centerline, one of said tracks having a servo field and a calibration field with a calibration field centerline that is offset from the track centerline, said calibration field includes a single calibration burst providing a burst profile with a peak value, that is used to generate a position offset signal, said calibration burst being written by said head, a second one of said tracks having a servo field and a calibration storage field with a calibration storage field center line that is centered along the track centerline, wherein information representing the position offset is stored in the calibration storage field.

6. The hard disk drive as recited in claim 5, wherein said position offset signal has a position offset signal amplitude that is stored in said calibration storage field.

7. The hard disk drive as recited in claim 5, wherein said track includes a data field, said calibration field being located in said data field.

8. The hard disk drive as recited in claim 5, wherein said servo field of said one of said tracks and said servo field of said second one of said tracks each contains a set of servo bits including an A bit and a B bit that have a common boundary located at the track centerline.

9. A method for calibrating and storing information representing the offset between a read element and a write element of a head in a hard disk drive, comprising the steps of:

a) providing a disk having a plurality of tracks each having a centerline, a first one of said tracks having a servo field and a single calibration burst providing a burst profile with a peak value, said calibration burst having a calibration burst centerline that is offset from the track centerline, a second one of said tracks having a servo field and a calibration storage field with a calibration storage field centerline that is centered along the track centerline;

b) measuring a profile of the single calibration burst;

c) generating a position offset signal corresponding to the sensed single calibration burst, said position offset signal having an offset amplitude; and d) storing said position offset signal amplitude in the calibration storage field.

10. The method of claim 9 further comprising the steps of:

e) aligning said read element with the calibration storage field centerline; and f) reading the position offset signal amplitude located on the calibration storage field.

11. The method as recited in claim 9, wherein step b) comprises the steps of:

b1) aligning a read element over a first position of the track that −50% from the track centerline;

b2) sensing the magnitude of the calibration burst at the first position;

b3) aligning the read element over a plurality of positions of the track that is between −50% from the track center line and +50% from the track centerline;

b4) sensing the magnitude of the calibration burst at the plurality of positions; and b5) storing the magnitudes of the calibration burst corresponding to the first position and the plurality of positions as the provide of the calibration burst.

12. The method as recited in claim 9, further comprising the steps of:

g) aligning the read element over the track centerline; and h) moving the read element in accordance to the position offset signal amplitude stored in the memory device.

*13. A hard disk drive, comprising:*

*a spin motor;*

*an actuator arm;*

*a head that is coupled to said actuator arm, said head containing a read element and a write element;*

*a disk that is attached to said spin motor, said disk having a plurality of tracks each having a respective track centerline, said plurality of tracks including a dedicated track, said dedicated track having stored thereon one or more system parameters including position offset information in alignment with said track centerline of said dedicated track; and,*

*a servo controller configured to initially move said head to said dedicated track upon powering up of said hard disk drive, and to read said system parameters while said read element is centered along said track centerline of said dedicated track, said servo controller causes storage of said position offset information on said dedicated track, and determines said position offset information from at least one servo burst before storage on said dedicated track.*

*14. A method for reading system parameters of a hard disk drive having a head, which contains a read element and a write element, said method, comprising:*

*determining position offset information from at least one servo burst with a controller of the hard disk drive;*

*storing the position offset information on a centerline of a dedicated track of a disk;*

*powering up the disk drive;*

*initially aligning said write element of said head with the centerline of the dedicated track of said disk that contains at least one system parameter including position offset information that is aligned with the centerline of the dedicated track; and,*

*reading said system parameter from said dedicated track.*

*15. The hard disk drive according to claim 13, wherein said position offset information corresponds to at least one of said plurality of tracks other than said dedicated track, said position offset information representing a distance between respective centers of said write element and said read element with respect to a direction of travel while said head travels along said at least one of said plurality of tracks.*

*16. The method for writing system parameters according to claim 14, wherein:*

*said position offset information corresponds to at least one data track different from said dedicated track, said position offset information representing a distance between respective centers of said write element and said read element with respect to a direction of travel while said head travels along said at least one of data track.*

* * * * *